(12) United States Patent
Riddering et al.

(10) Patent No.: US 6,700,724 B2
(45) Date of Patent: Mar. 2, 2004

(54) CONTACT DETECTION AND CALIBRATION FOR ELECTROSTATIC FLY HEIGHT CONTROL IN A DISC DRIVE

(75) Inventors: Jason W. Riddering, Prior Lake, MN (US); Lee C. Knippenberg, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/119,178

(22) Filed: Apr. 9, 2002

(65) Prior Publication Data

US 2003/0043491 A1 Mar. 6, 2003

Related U.S. Application Data

(60) Provisional application No. 60/314,521, filed on Aug. 22, 2001.

(51) Int. Cl.[7] .............................................. G11B 19/02
(52) U.S. Cl. ........................................................ 360/69
(58) Field of Search ................................ 360/69, 31, 75, 360/55, 25

(56) References Cited

U.S. PATENT DOCUMENTS

| | | | |
|---|---|---|---|
| 4,853,810 A | * | 8/1989 | Pohl et al. .................. 360/103 |
| 5,153,785 A | | 10/1992 | Muranushi et al. ............ 360/75 |
| 6,005,736 A | | 12/1999 | Schreck ........................ 360/75 |
| 6,166,874 A | * | 12/2000 | Kim ............................. 360/75 |
| 6,196,062 B1 | | 3/2001 | Wright et al. .................. 73/105 |
| 6,249,393 B1 | * | 6/2001 | Billings et al. ................ 360/31 |
| 6,359,746 B1 | | 3/2002 | Kakekado et al. ............. 360/75 |
| 6,570,730 B1 | * | 5/2003 | Lewis et al. ................... 360/75 |

OTHER PUBLICATIONS

Abstract for "Head Dick Interface Charge and Its Potential Applications," of Zhu Feng et al., with the Recording Media Group of Seagate Technology, Inc., Proceedings of the 1999 IEEE International Magnetics Conference (May 18–May 21, 1999) (2 pages).

\* cited by examiner

*Primary Examiner*—David Hudspeth
*Assistant Examiner*—Mitchell Slavitt
(74) *Attorney, Agent, or Firm*—Westman, Champlin & Kelly

(57) ABSTRACT

A disc drive includes a head with an air bearing surface that provides a fly height spacing. A fly height spacing control system provides a control signal to a head electrical connection on a head and a disco electrical connection on a disc. Fly height is controlled electrostatically. A disconnect circuit couples the control signal to the disc electrical connection. The disconnect circuit provides a disconnection of the control signal when contact is sensed. A contact sensor senses an electrical current component of the control signal that indicates contact between the head and the disc.

28 Claims, 18 Drawing Sheets

CONTACT DETECTION AND CALIBRATION FOR ELECTROSTATIC FLY HEIGHT CONTROL IN A DISC DRIVE

CROSS-REFERENCE TO RELATED APPLICATION

This application claims priority benefits from U.S. Provisional Application No. 60/314,521 titled "Contact Detection and Calibration for Electrostatic Fly Height Control in Disc Drive," filed Aug. 22, 2001 and identified as Docket Number STL 10455.01.

FIELD OF THE INVENTION

The present invention relates generally to magnetic data storage drives. In particular, this invention relates to methods and structures for fly height control.

BACKGROUND OF THE INVENTION

As the areal density in newer disc drive designs increases, the magnetic spacing and fly height between the pole tips of the read/write heads and the magnetic storage media becomes correspondingly smaller. With these extremely small fly heights, manufacturing variations in the disc topography, particularly during seeking operations, can result in undesired transient mechanical contact between the head and the disc.

To reduce instances of undesired contact, there is a desire to use electrostatic type actuators in fly height control arrangements because of their low cost, low mass and low power consumption. Electrostatic actuators, however, generate an attractive force between the head and the disc that has an approximately inverse square relationship to the spacing. As the head moves closer to the disc, the attractive force increases asymptotically. The electrostatic force can force the head to crash into the disc, resulting in damage to the head, the disc, or both. When the head is very close to the disc and the electrostatic actuator is used, the control of the fly height becomes unstable.

A method and an apparatus are needed to reduce the damage to heads or discs when a disc drive includes an electrostatic actuator controlling fly height spacing and the head contacts the disc.

SUMMARY OF THE INVENTION

Disclosed is a disc drive that comprises a disc and a read/write head. The read/write head has an air bearing surface shaped to provide a fly height spacing between the air bearing surface and the disc. The disc has a disc electrical connection and the read/write head has a head electrical connection connected to a conductive region of the read/write head that faces the disc.

The disc drive also comprises a fly height spacing control system including a controller that provides a control signal coupled to the disc electrical connection and the head electrical connection.

The disc drive also comprises a contact sensor. The contact sensor senses an electrical current component of the control signal indicative of contact between the disc and the read/write head. The contact sensor provides a contact sensor output.

The disc drive also comprises a disconnect circuit that couples the control signal to the head electrical connection. The disconnect circuit responds to the contact sensor output and provides a disconnection of the control signal when contact is sensed.

These and various other features as well as advantages that characterize the present invention will be apparent upon reading of the following detailed description and review of the associated drawings.

DETAILED DESCRIPTION OF ILLUSTRATIVE EMBODIMENTS

Figure 1:
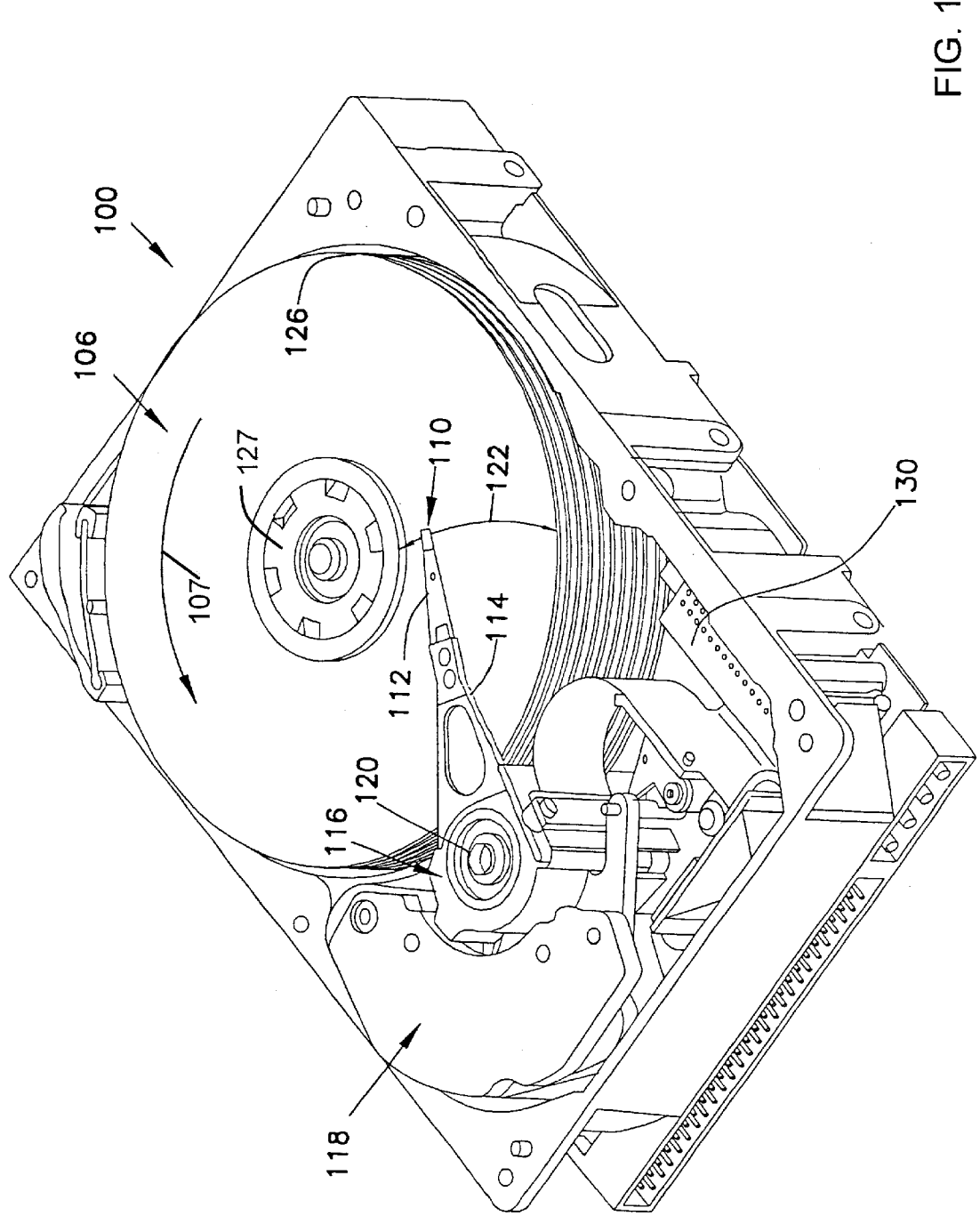
FIG. 1 illustrates a disc drive.

In the disc drive embodiments discussed below, fly height spacing between a head and a disc is sensed, and a controller provides a control signal voltage that electrostatically adjusts the fly height spacing to maintain fly height at a desired set point. When the spacing is extremely close, however, the control provided by the control circuit is unstable and the read/write head can be drawn into undesired contact with the disc by electrostatic attraction. The disc drive, however, also includes a contact sensor that senses the undesired contact. A disconnection circuit, typically a relay or solid state switch, abruptly reduces the control signal voltage to near zero when contact is sensed. The electrostatic force is also abruptly reduced to near zero, and the head is not held in contact with disc long enough to cause significant damage. After a stable fly height spacing is reestablished, the control signal is reapplied to a head electrical connection and normal disc drive operations resume. The damage to the disc and head are reduced and reliability is improved.

Contact can be detected by sensing control signal current flowing through a resistor or transformer primary in series between the controller and the head and disk. If contact occurs, current starts to flow and a voltage drop is present across the resistor or at the transformer secondary. An OP AMP comparator senses the voltage drop and triggers a switch that has sufficient speed to shut off the electrostatic voltage reaching the head electrical connection before significant damage can be done. This circuit can be used for calibration or as a real time contact detection algorithm during normal operation of the disc drive. The switch can be the contacts of a relay or a solid state switch.

As the areal density in newer disc drive designs increases, the magnetic spacing between the pole tips of the read/write heads and the magnetic storage media becomes correspondingly smaller. A portion of this magnetic spacing is used up by coatings and lubricants. A portion of this magnetic spacing is also used up by an allowance for pole tip recession (PTR) and thermal pole tip recession (T-PTR), which reduces magnetic spacing at higher temperatures. After these features use up portions of the magnetic spacing, only an extremely small mechanical spacing, or fly height, is left for an air bearing layer between the read/write head and the disc. With these extremely small fly heights, manufacturing variations from the head build in the disc topography, particularly during seeking operations, or during mechanical shock from the disc drive environment can result in undesired transient mechanical contact between the head and the disc.

To reduce instances of undesired mechanical contact, an electrostatic actuator is used to actively adjust the fly height. The fly height spacing (or magnetic spacing) is sensed and electronic feedback is provided to the electrostatic actuator to control the fly height. Using feedback, a relatively constant fly height spacing is maintained with a reduced number of instances of mechanical contact.

Electrostatic type actuators are useful in such feedback arrangements because of their low cost, low mass and low power consumption. Electrostatic actuators, however, generate an attractive force between the head and the disc that has an approximately inverse square relationship to the spacing. As the head moves closer to the disc, the attractive force increases asymptotically. The electrostatic force can force the head to crash into the disc, resulting in damage to the head, the disc, or both. When the head is very close to the disc, the control of the fly height becomes unstable with an electrostatic type of actuator.

While the air bearing surface of the read/write head and the electronic feedback can be adjusted somewhat in an effort to compensate for this instability, these adjustments are not completely effective over all operating conditions. As the spacing approaches zero, control is unstable and electrostatic attraction will force the head into the disc and hold the head in contact with the disc long enough to cause damage. The electronic feedback has a time delay and does react fast enough to prevent the damage. The embodiments described below overcome this problem.

FIG. 1 illustrates an embodiment of a disc drive storage device 100. Disc drive 100 includes a disc pack 126 having storage surfaces 106 that are illustratively layers of material (such as magnetic material or optically readable material). The disc pack 126 includes a stack of multiple discs each accessible by a read/write assembly 112 that includes a read/write head 110, also called a slider. Each read/write head 110 flies over a disc at a fly height that is actively controlled as explained in more detail below. A spindle motor 127 drives rotation of the discs in disc pack 126 in a direction such as that shown by arrow 107. As discs are rotated, read/write assembly 112 accesses different rotational locations on the storage surfaces 106 in disc pack 126.

Read/write assembly 112 is actuated for radial movement relative to the disc surfaces 106, such as in a direction indicated by arrow 122, in order to access different tracks (or radial positions) on the disc surfaces 106. Such actuation of read/write assembly 112 is illustratively provided by a servo system that includes a voice coil motor (VCM) 118. Voice coil motor 118 includes a rotor 116 that pivots on axis 120. VCM 118 also illustratively includes an arm 114 that supports the read/write head assembly 112.

Disc drive 100 illustratively includes control circuitry 130 for controlling operation of disc drive 100 and for transferring data in and out of the disc drive 100. As explained in more detail below in connection with FIGS. 8–14, the control circuitry 130 can include a fly height controller that operates in conjunction with an electrostatic fly height actuator.

In extremely low fly height disc drives, the air bearing by itself cannot maintain proper clearance with the disc. This is due to the fact that the mean losses from disc glide avalanche, carbon overcoats, pole tip recession, and lube leave insufficient space for fly height variation. This is explained in more detail below in connection with FIGS. 2 and 3.

Figure 2:
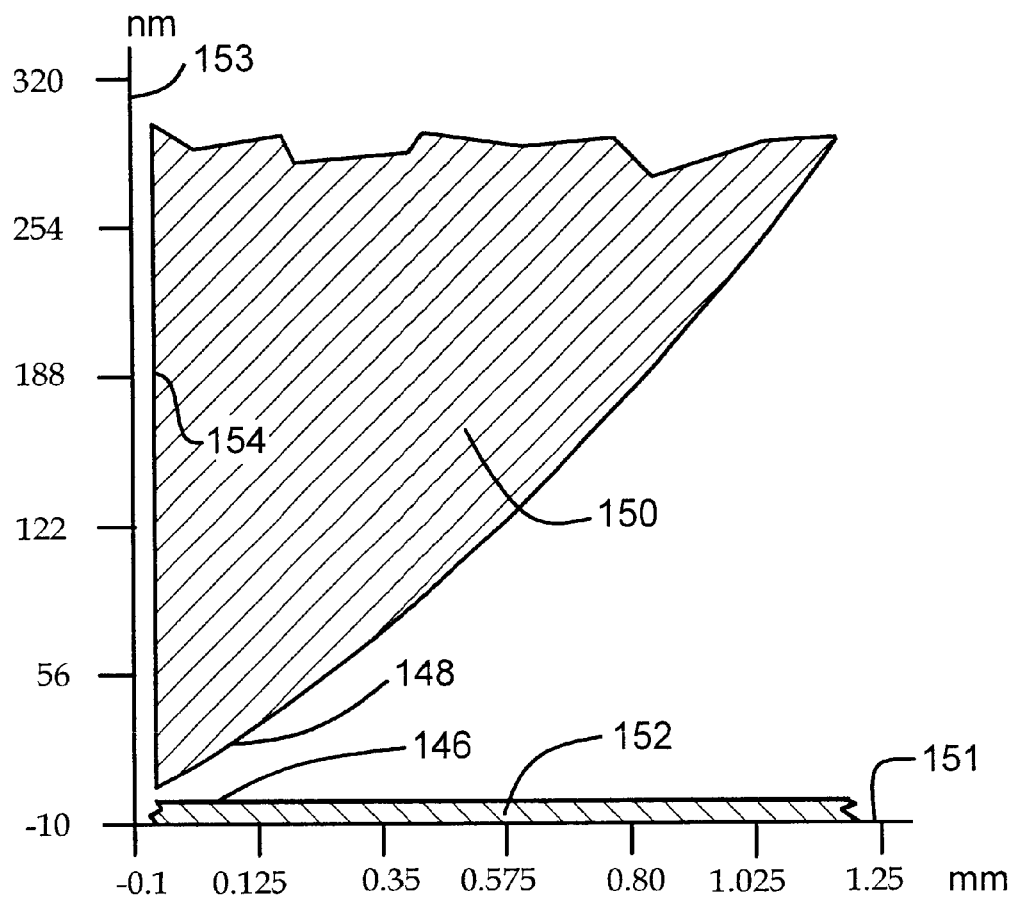
FIG. 2 illustrates a portion of a head flying over a disc.
Figure 3:
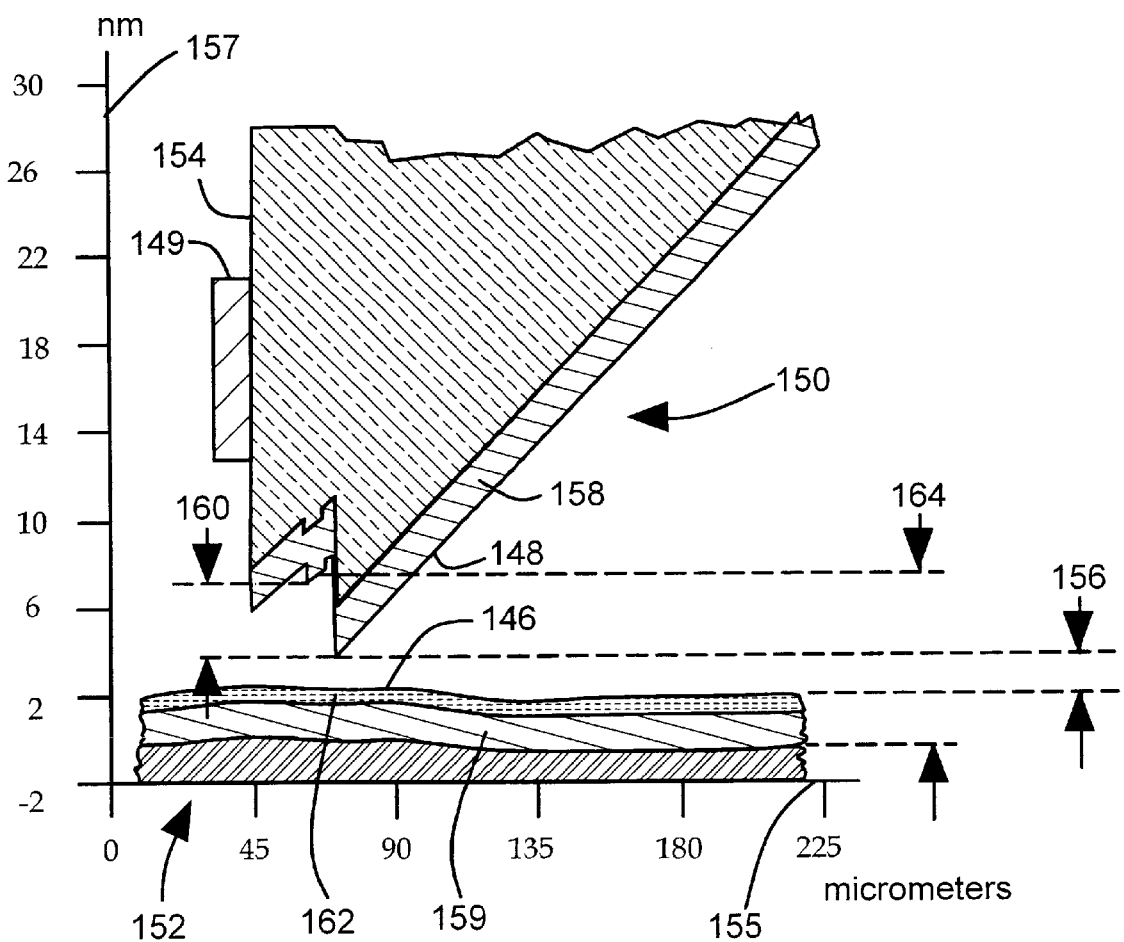
FIG. 3 illustrates an enlarged view of the arrangement in FIG. 2.

FIGS. 2–3 illustrate a portion of a head 150 flying over a disc 152. The arrangement shown in FIG. 2 is enlarged by different horizontal and vertical scale factors. A horizontal scale 151 shows horizontal distances in millimeters. A vertical scale 153 shows vertical distances in nanometers. FIG. 3 is a further enlarged view of the arrangement in FIG. 2, showing more detail near a trailing edge 154 of the slider. The arrangement shown in FIG. 3 is enlarged by different horizontal and vertical scale factors. A horizontal scale 155 shows horizontal distances in micrometers. A vertical scale 157 shows vertical distances in nanometers.

At an extremely low fly height 156, diamond-like carbon coatings 158, 159, pole tip recession 160, and lubrication layer 162 take up a significant portion of the magnetic spacing 164. As illustrated in FIG. 3, the magnetic spacing 164 is about 7 nm, but the mechanical spacing or fly height 156 is only about 2 nm. The fly height 156 is the minimum spacing between the air bearing surface 148 and the top surface 146 of the lubrication layer 162. For test purposes, an acoustic emission (AE) sensor 149 can be deposited on the trailing edge 154 and connected to circuitry (not illustrated) that provides an acoustic emission sensor output that indicates when the head contacts the disc. Additional variation of fly height 156 can come from manufacturing variation, thermal pole tip protrusion, drive environment, or dynamic fly height losses due to disc topography or seeking. To compensate for these variations, an electrostatic actuator is included in the disc drive as explained in more detail below in connection with FIGS. 4–5.

Figure 4:
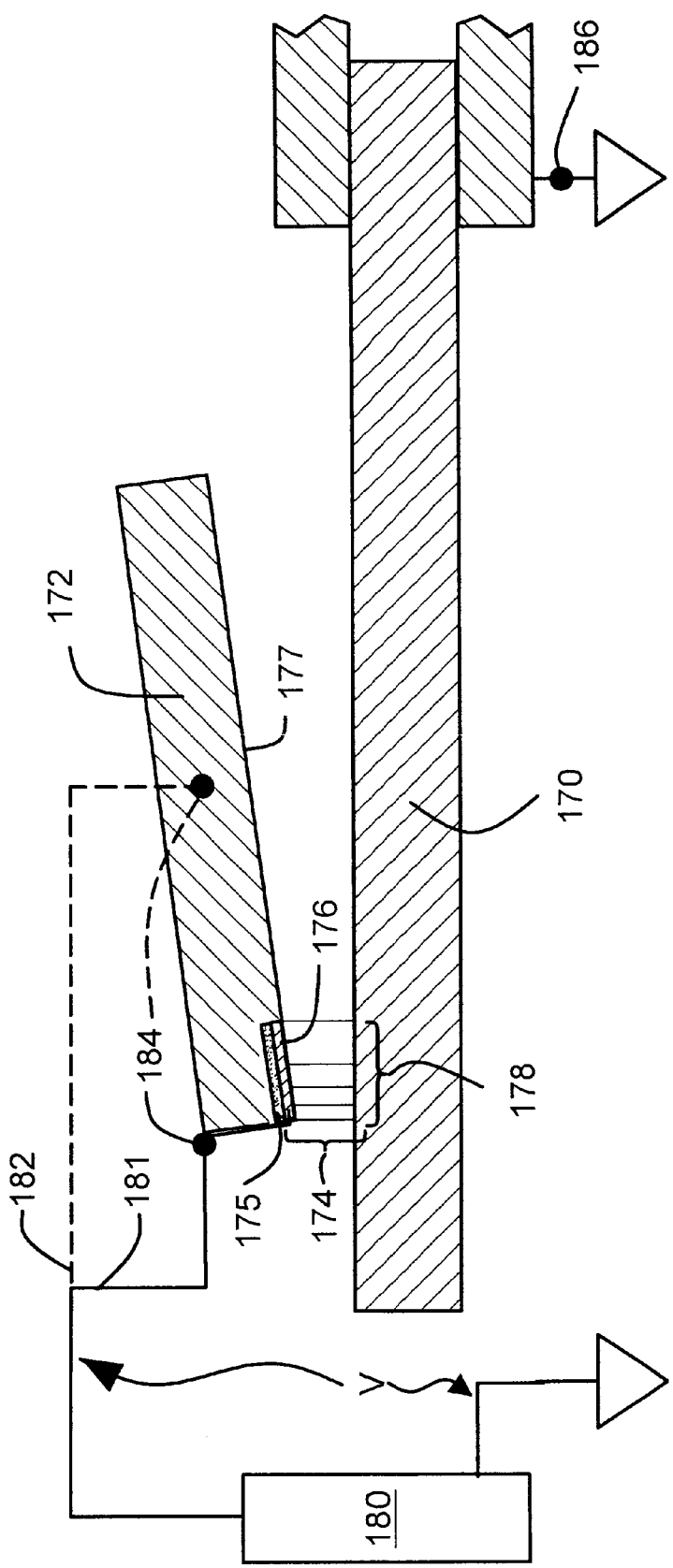
FIG. 4 illustrates a disc, a head and a fly height controller.

FIG. 4 illustrates a disc 170 and a head 172 that include an electrostatic fly height actuator 174. The "electrostatic fly height actuator" 174 can be effectively formed without any addition to conventional head and disc structures other than providing electrical connections 184, 186 on the conventional disc and head structures so that the control signal V can be connected. The disc 170 can be connected at a disc electrical connection 186 to a common conductor as shown. Stray electrical paths from the head 172 to the common conductor are eliminated so that the head 172 (or a portion of it) can be charged relative to the disc 170. The head 172 has a head electrical connection 184 that connects to a fly height controller 180. The head 172 acts as a first capacitor plate, and the portion of the disc that faces the first capacitor is plate acts as a second capacitor plate. The two capacitor plates are separated by the air gap and are electrostatically attracted to one another when a control signal is applied by the controller 180 to the head electrical connection 184 and the disc electrical connection 186.

The electrostatic fly height actuator 174 comprises a first actuator electrode 176 formed on at least a portion of the air bearing surface 177, and a second actuator electrode 178 formed on a portion of the disc 170 that faces the first actuator electrode 176. The second actuator electrode 178 has a shape that is defined by the facing shape of the first actuator electrode 176 that overlies it. The control signal V is generated by a controller 180 and is coupled by electrical conductors to the first actuator electrode 176 along line 181 and to the second actuator electrode 178 along a circuit common conductor as illustrated. First actuator electrode 176 can be a metallization that is insulated from the main body of the head 172 by an insulating layer 175. Alternatively, the head 172 itself can be connected to the controller 180 along line 182 and the entire head 172 can serve as the first electrode. The difference V in electrical potential between the first and second actuator electrodes 176, 178 generates an electrostatic attractive force which is explained in more detail below in connection with FIG. 5.

Figure 5:
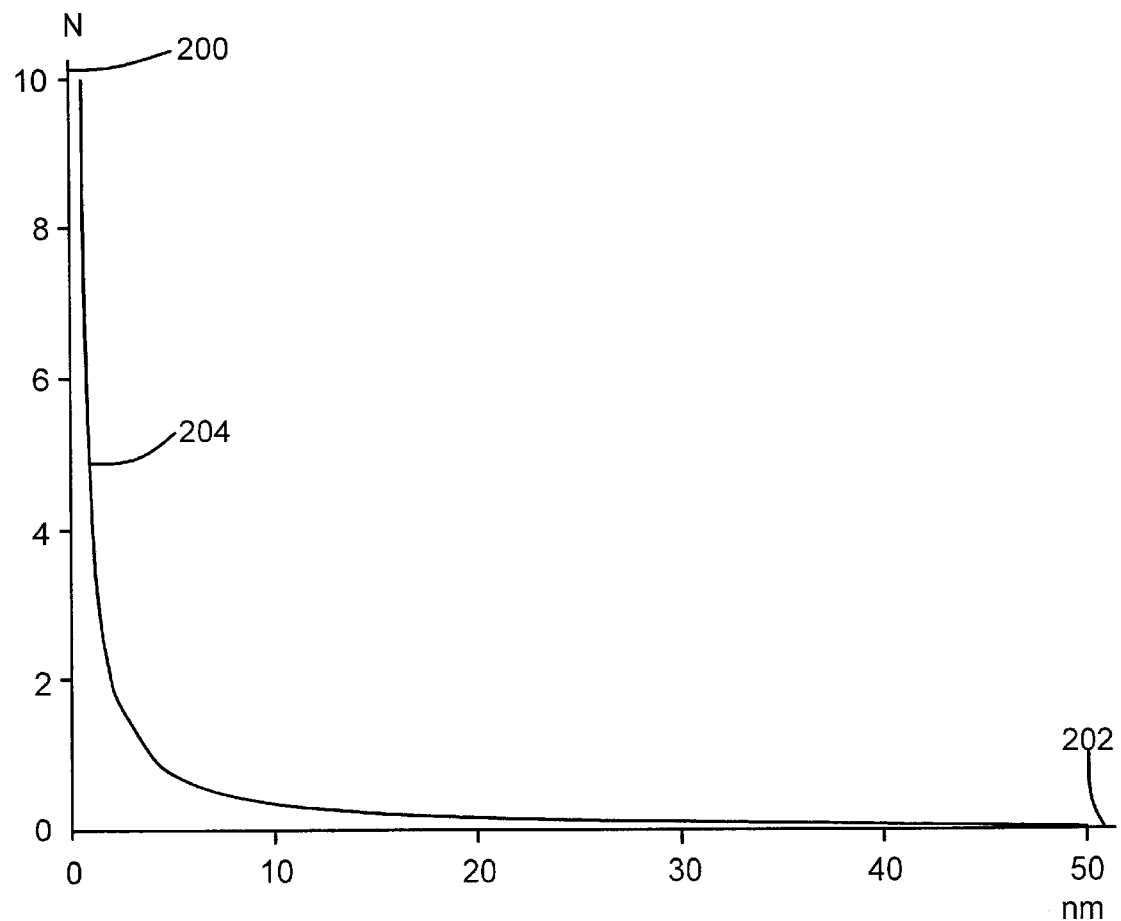
FIG. 5 illustrates electrostatic force between a read/write head and a disc as a function of spacing.

FIG. 5 illustrates electrostatic force in an electrostatic fly height control actuator as a function of actuator spacing. FIG. 5 includes a vertical axis 200 representing electrostatic attractive force in Newtons (N). FIG. 5 includes a horizontal axis 202 that represents mechanical spacing or fly height in nanometers (nm). Since the spacing between the slider and disc surface is so small, a significant amount of electrostatic force can be generated by either charging the entire slider body or by creating a separate electrode on the slider surface. A voltage is applied to the slider body, or the dedicated electrode, and the disc acts as a grounded electrode. Electrostatic fly height control can be used, however, a significant problem arises from the relationship 204 of electrostatic force as a function of spacing. As shown in Equation 1 below, the electrostatic force is approximately inversely related to the spacing squared.

$$F = \frac{(1/2)\varepsilon_0 A V^2}{d^2} \qquad \text{Equation 1}$$

where F is electrostatic attractive force;
$\varepsilon_0$ is the permittivity of the air in the gap;
A is the area of each electrode;
V is the voltage applied to head and disc connections; and
d is the spacing between the electrodes.

This produces the highly non-linear response 204 as shown in FIG. 5. As the spacing approaches a zero spacing asymptote, the force approaches infinity asymptotically. The practical implication of this relationship is that above a certain threshold voltage or below a certain spacing, the attractive force becomes so high that the slider is forced to crash catastrophically into the disc. Moreover, this threshold voltage is not constant and not known ahead of time. Any time that the head is being actuated, or if there is an external condition that causes the head disc spacing to reduce, the slider can be drawn down to the disc and crashed. The electrostatic force is attractive and tends to draw the head toward the disc. The head is also subject to a lift force generated by the air bearing layer between the head and the disc. The combined effect of the lift force and the electrostatic force is explained in more detail below in connection with FIG. 6.

Figure 6:
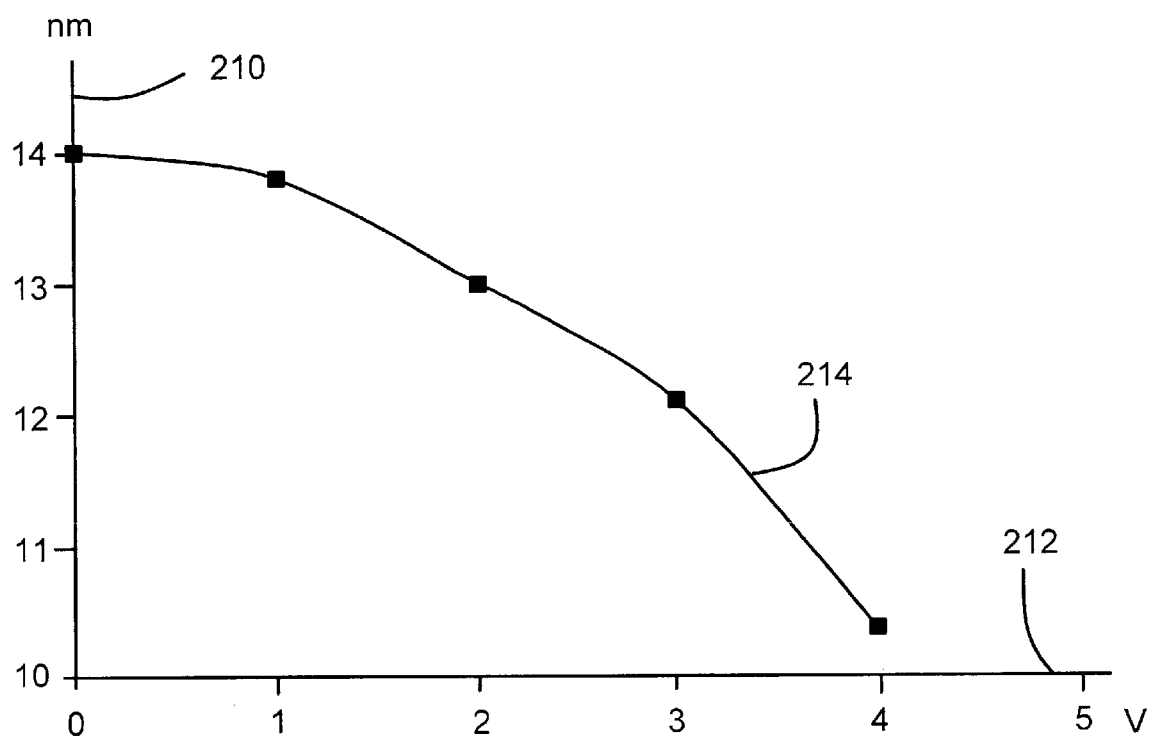
FIG. 6 illustrates spacing between a head and a disc as a function of control signal voltage.
Figure 7:
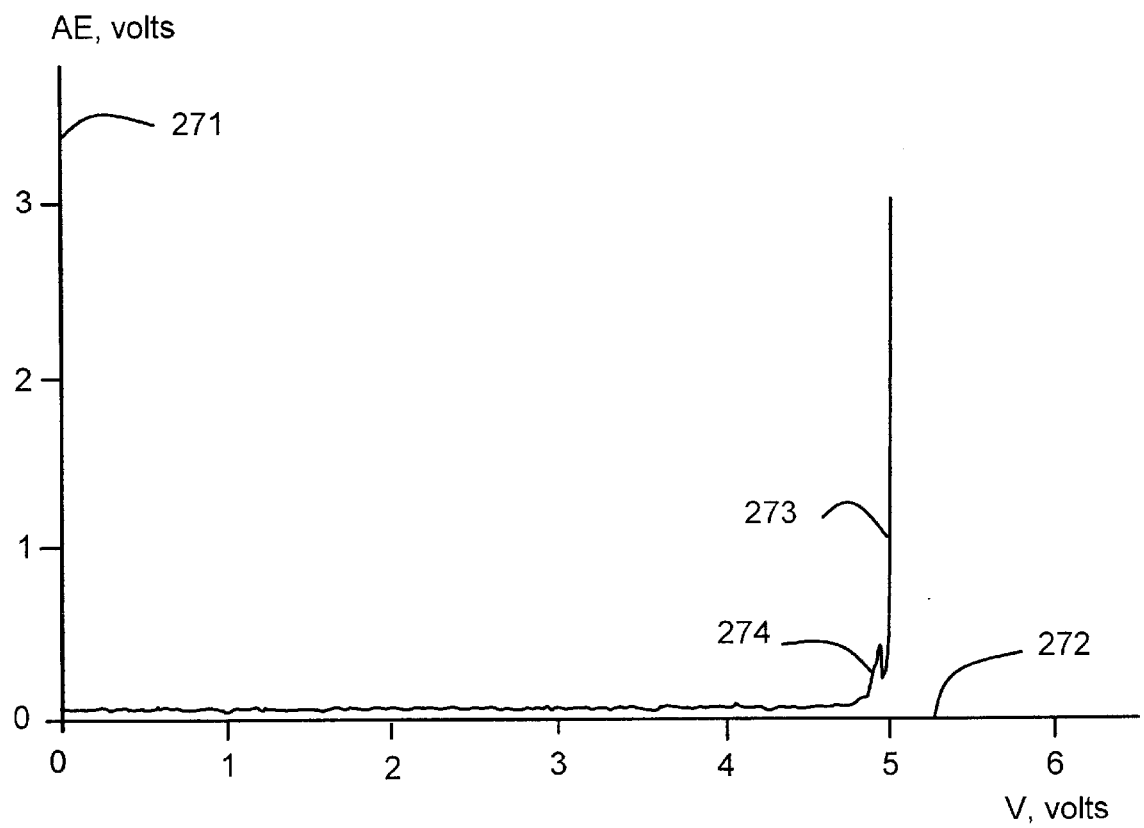
FIG. 7 illustrates an output of an acoustic emission (AE) sensor as a function of electrostatic voltage applied between a read/write head and a disc.

FIG. 6 illustrates the fly height gap as a function of electrostatic voltage applied to the head electrical connection 184 and the disc electrical connection 186 for a particular head/disc combination. In FIG. 6, the vertical axis 210 represents the fly height spacing (gap) in nanometers and the horizontal axis 212 represents the voltage V applied to the electrical connections 184, 186. The relationship is non-linear, and as the applied electrostatic voltage increases, the slope of the fly height/voltage curve 214 becomes steeper due to the non-linearity of the electrostatic force as a function of fly height. In regions where the curve 214 becomes steeper, fly height control becomes less stable and contacts and damage could occur as illustrated in FIG. 7 below. This damage is avoided or reduced, however, by the contact sensing and disconnect arrangements illustrated in FIGS. 8–14 below.

FIG. 7 shows a typical response curve of an acoustic emission (AE) sensor (such as sensor 149 in FIG. 3) as a function of an electrostatic voltage V applied to a head electrical connection and a disc electrical connection on a spin test stand. The vertical axis 271 represents acoustic emission sensor output and the horizontal axis 272 represents applied electrostatic voltage V. For this exemplary head/disc combination the slider crashed at just under V=5 volts as illustrated at 273. Similar head/disc combinations have shown a range of threshold voltage for contact from V=1.0 to 5.5 volts. An increase 274 in acoustic emission sensor output just prior to crashing is not consistent and therefore does not provide an adequate means of sensing and avoiding contact. Contact has occurred without any initial increase 274 in acoustic emission sensor output.

Figure 8:
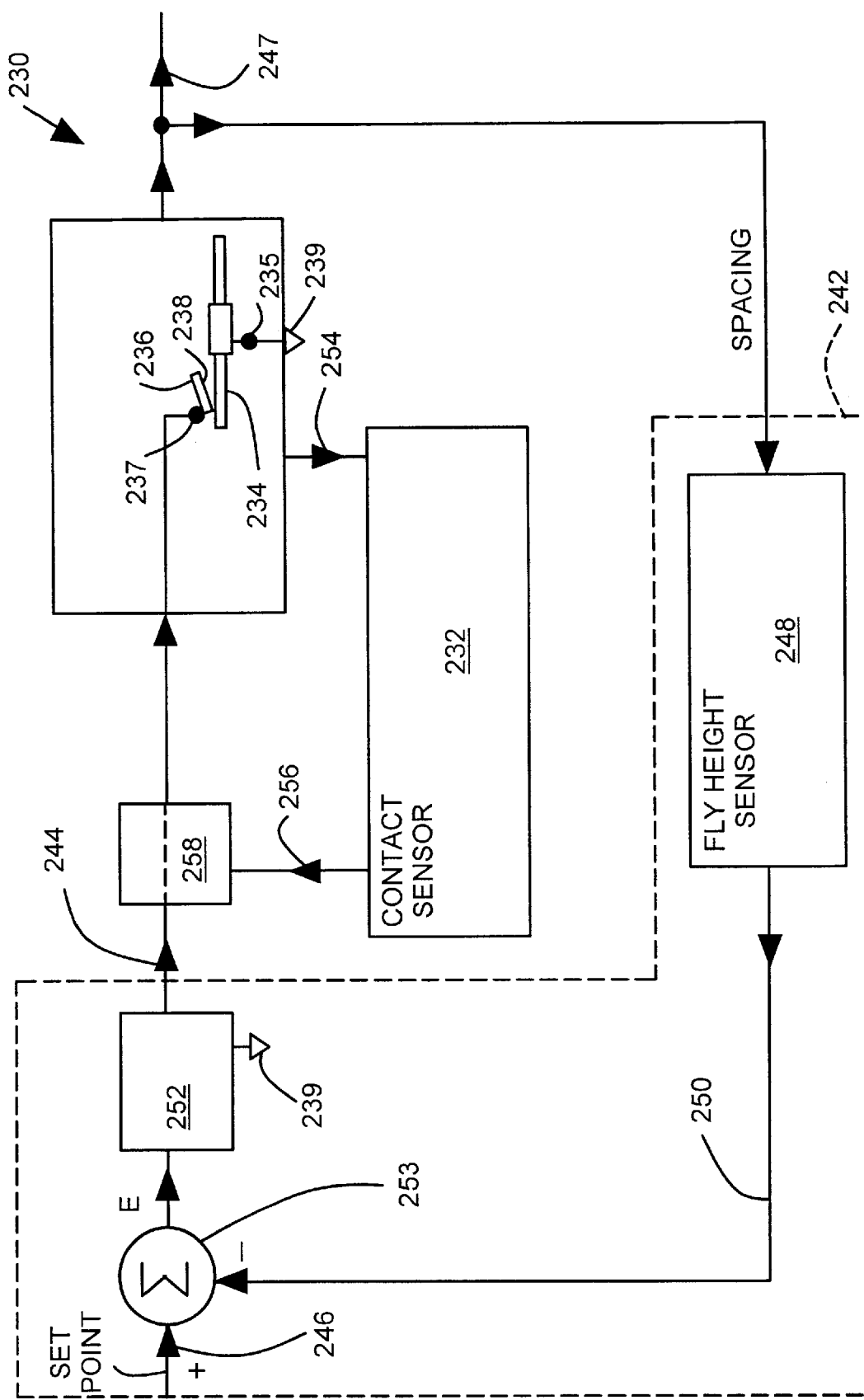
FIG. 8 illustrates a first embodiment of a disc drive with a contact sensor circuit.

FIG. 8 illustrates a first embodiment of a disc drive 230 with a contact sensor circuit 232. The disc drive 230 includes a disc 234 and a read/write head 236. The read/write head 236 has an air bearing surface 238 shaped to provide a fly height spacing 247 between the air bearing surface 238 and the disc 234. As explained above in connection with FIG. 4, a disc electrical connection 235 is provided on the disc 234 and a head electrical connection 237 is provided on the read/write head 236.

A fly height spacing control system 242 includes a fly height controller 252 that generates a control signal 244 that is coupled to the head electrical connection 237. In a preferred arrangement, the fly height spacing control system 242 comprises a set point 246, a fly height sensor 248 that provides a fly height sensor output 250, and the controller 252 generates the control signal 244 as a function E of the set point 246 and the fly height sensor output 250. In a preferred arrangement, a summing junction 253 generates the function E, which is an error signal, as the difference between the set point 246 and the fly height sensor output 250 as illustrated. Other arrangements of fly height spacing control systems can be used as well. The fly height sensor 248 can be a magnetic, electrostatic, optical or other spacing sensor that senses fly height spacing 247, depending on the needs of the application.

The contact sensor 232 senses an electrical current component 254 of the control signal 244 that passes from the controller 252 through the head electrical connection 237 and the disc electrical connection 235. The electrical current component 254 indicates contact between the disc 234 and the read/write head 236. The contact sensor 232 provides a contact sensor output 256 to a disconnect circuit 258.

The disconnect circuit 258 couples the control signal 244 to the head electrical connection 237 during normal operating conditions. When the contact sensor 232 senses contact, then the disconnect circuit 258 provides a disconnection of the control signal 244 responsive to the contact sensor output 256. The disc drive 230 illustrated generally in FIG. 8 can be implemented with a variety of electronic circuits such as the examples explained below in connections with FIGS. 9–14.

Figure 9:
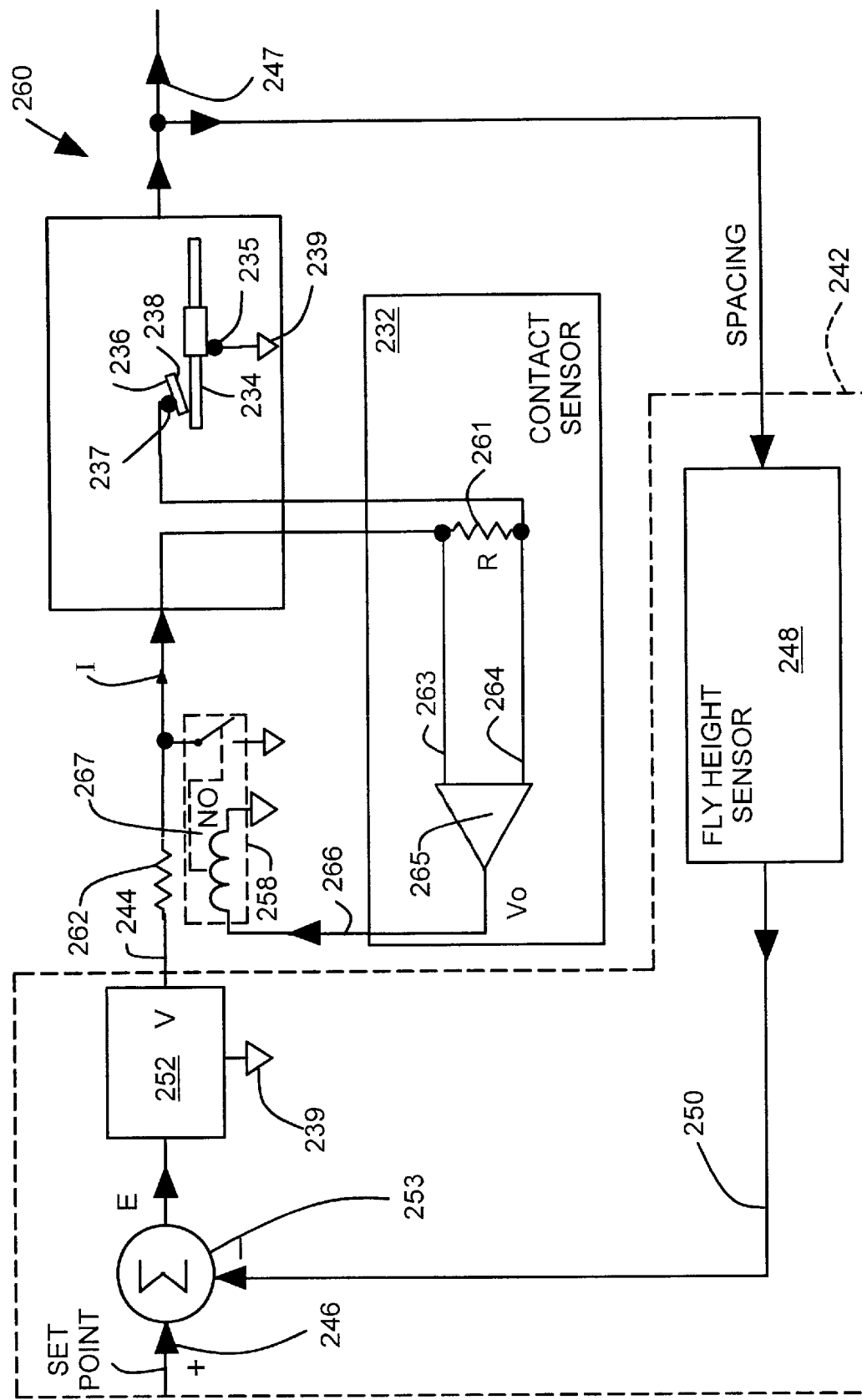
FIG. 9 illustrates a second embodiment of a disc drive with a contact sensor circuit.

FIG. 9 illustrates a second embodiment of a disc drive 260 that is similar to the disc drive 230 illustrated in FIG. 8, and the same reference numerals are used to identify the same or similar features in FIGS. 8–9.

In FIG. 9, the contact sensor circuit 232 includes a current sensing resistor R at 261 in series with a resistor 262. An electrical current component I of the control signal couples from controller 252 through resistors 262, 261 to the head electrical connection 237. The voltage developed across current sensing resistor R is coupled to inputs 263, 264 of a differential amplifier 265. The amplifier 265 amplifies the voltage across resistor R and generates an amplified voltage Vo at 266. When there is no contact between the head 236 and the disc 234, the electrical current component I is near zero. When there is contact, however, a non-zero current I flows through resistor R and generates a voltage drop across resistor R.

In FIG. 9, the disconnect circuit 258 includes a relay 267 with a normally open (NO) contact. The relay 267 has sufficiently fast switching time to disconnect the control signal from head electrical connection 237 before contact can cause damage to the head 236 or the disc 234. When there is contact, the normally open contact of relay 267 is closed, bypassing the control signal to a common conductor or ground so that the control signal does not reach the head electrical connection 237. Resistor 262 avoids shorting out controller 252, which avoids a large current flow from the controller 252. When the current I flows through the resistor R, a voltage drop will develop that will drive the OP AMP, comparator or other device adequately so that Vo will become high enough to trigger the relay 267 and allow current to flow through the relay contacts to ground. This reduces the voltage that is applied to the head electrical connection 237 to near zero.

Figure 10:
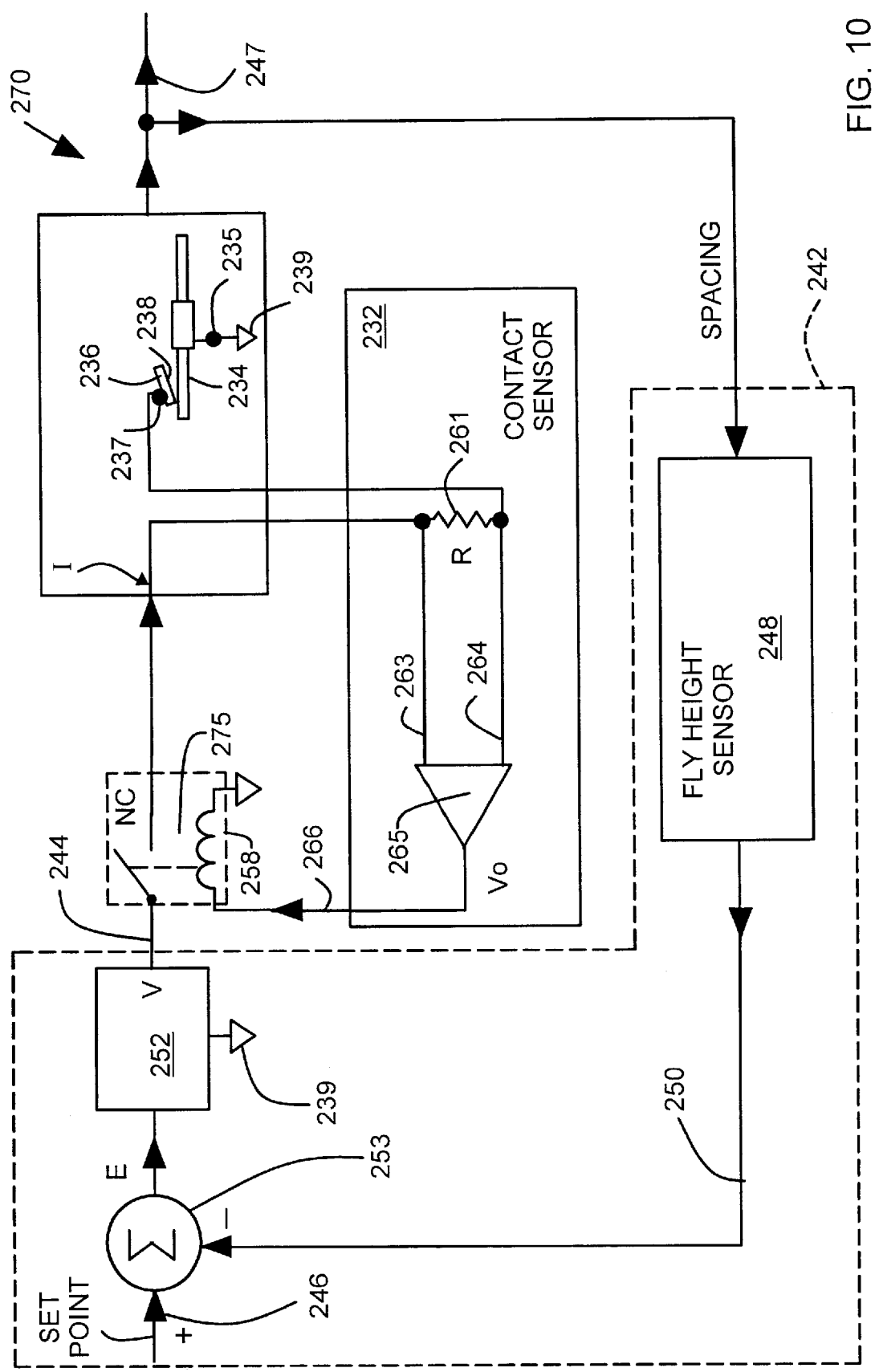
FIG. 10 illustrates a third embodiment of a disc drive with a contact sensor circuit.

FIG. 10 illustrates a third embodiment of a disc drive 270 that is similar to the disc drive 260 illustrated in FIG. 9, and the same reference numerals are used to identify the same or similar features in FIGS. 9, 10.

In FIG. 10, the contact sensor circuit 232 is arranged in the same way that it is arranged in FIG. 9. An electrical current component I of the control signal couples from controller 252 through resistor 261 to the head electrical connection 237. The voltage developed across current sensing resistor R is coupled to inputs 263, 264 of a differential amplifier 265. The amplifier 265 amplifies the voltage across resistor R and generates an amplified voltage Vo at 266. When there is no contact between the head 236 and the disc 234, the electrical current component I is near zero. When there is contact, however, a non-zero current I flows through resistor R and generates a voltage drop across resistor R.

In FIG. 10, the disconnect circuit 258 includes a relay 275 with a normally closed (NC) contact in series between the controller 252 and the head electrical connection 237. The relay 275 has sufficiently fast switching time to disconnect the control signal from the head electrical connection 237 before contact can cause damage to the head 236 or the disc 234. When there is head contact, the normally closed contact of relay 275 is opened, disconnecting the control signal 244 so that it does not reach the head electrical connection 237. When the current I flows through the resistor R, a voltage drop will develop that will send the OP AMP comparator into saturation and Vo will become high enough to trigger the relay 275. This reduces the voltage that is applied to the head electrical connection 237 to near zero.

Figure 11:
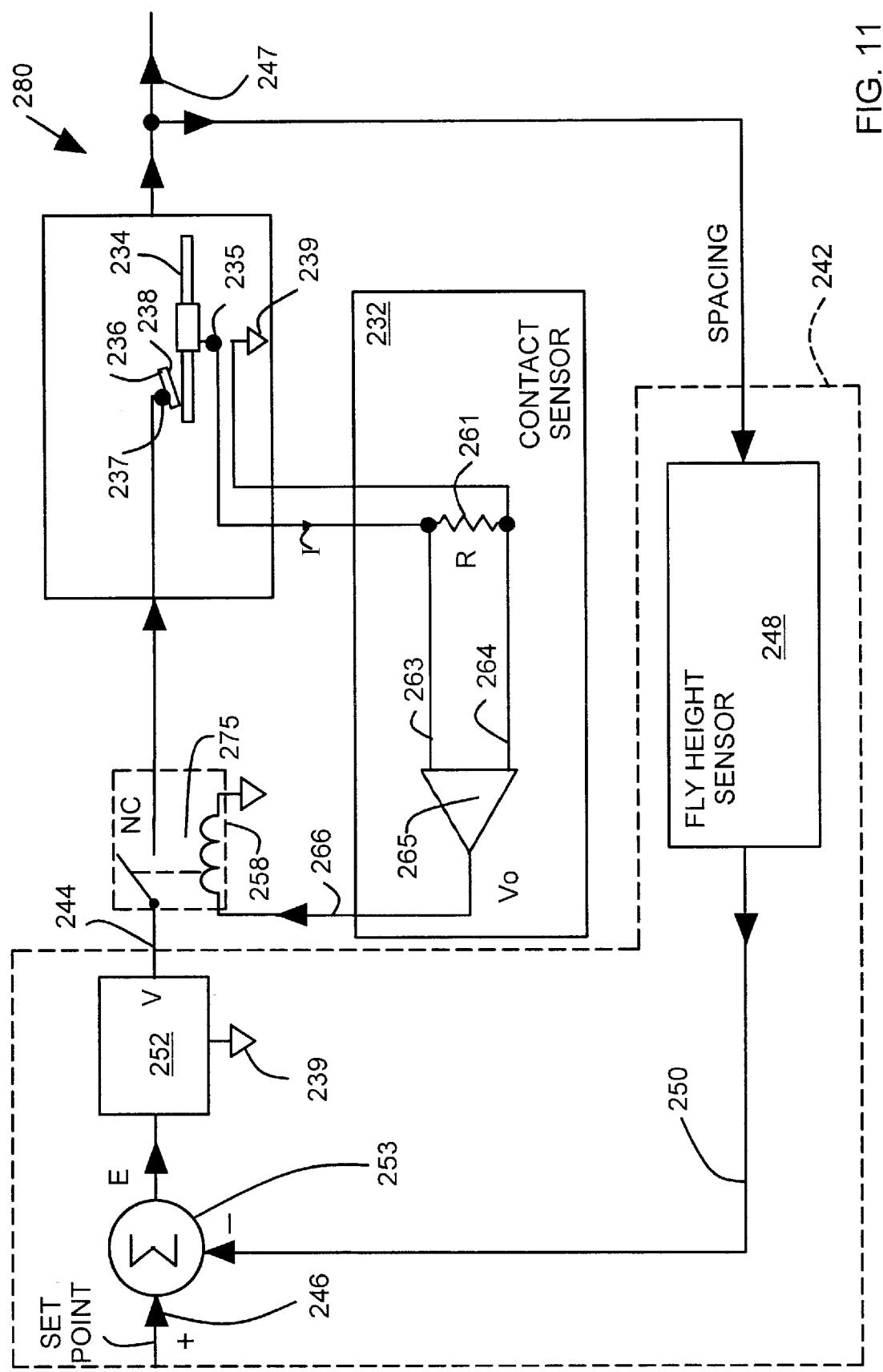
FIG. 11 illustrates a fourth embodiment of a disc drive with a contact sensor circuit.

FIG. 11 illustrates a fourth embodiment of a disc drive 280 that is similar to the disc drive 270 illustrated in FIG. 10, and the same reference numerals are used to identify the same or similar features in FIGS. 11, 10.

In FIG. 11, the contact sensor circuit 232 is connected differently than it is connected in FIG. 10. In FIG. 11, the contact sensor circuit 232 is connected between the disc electrical connection 235 and a circuit common conductor as illustrated. An electrical current component I of the control signal couples from disc 234 through resistor 261 to the circuit common conductor. In other respects, the circuits in FIGS. 10 and 11 are arranged in the same way.

Figure 12:
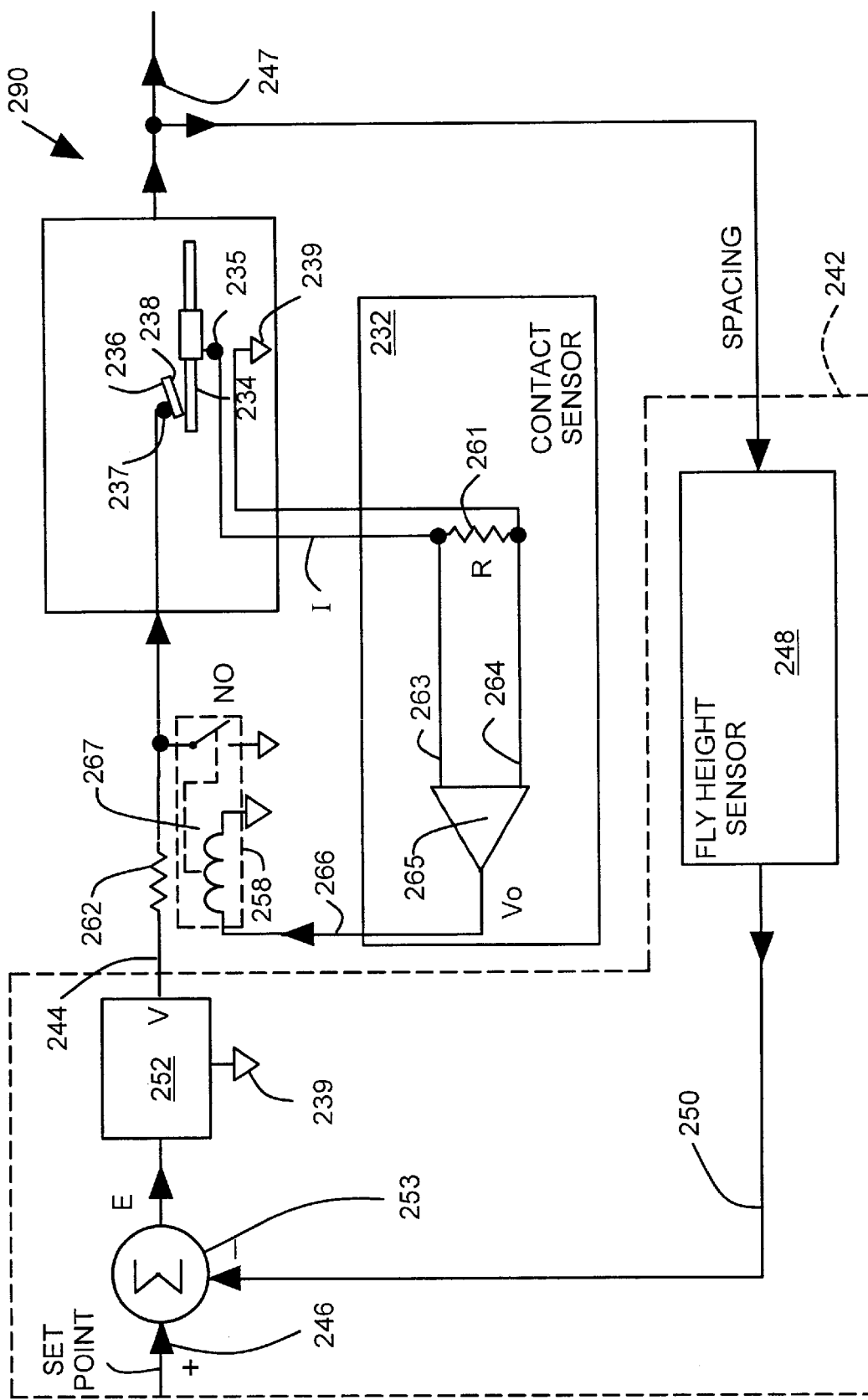
FIG. 12 illustrates a fifth embodiment of a disc drive with a contact sensor circuit.

FIG. 12 illustrates a fifth embodiment of a disc drive 290 that is similar to the disc drive 260 illustrated in FIG. 9, and the same reference numerals are used to identify the same or similar features in FIGS. 12, 9.

In FIG. 12, the contact sensor circuit 232 is connected differently than it is connected in FIG. 9. In FIG. 12, the contact sensor circuit 232 is connected between the disc electrical connection 235 and a circuit common conductor 239 as illustrated. An electrical current component I of the control signal couples from disc 234 through resistor 261 to the circuit common conductor 239. In other respects, the circuits in FIGS. 12 and 9 are arranged in the same way.

Figure 13:
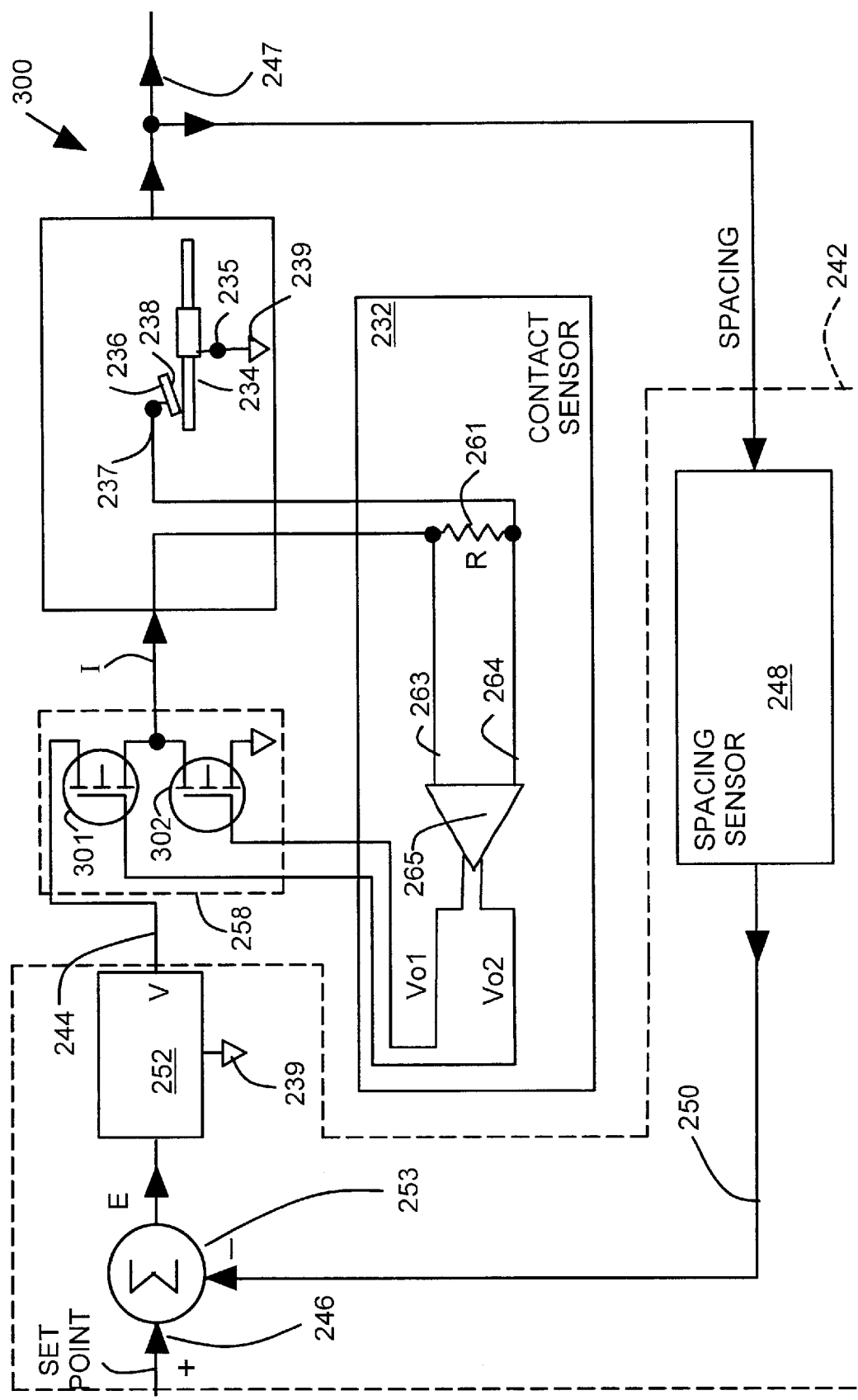
FIG. 13 illustrates a sixth embodiment of a disc drive with a contact sensor circuit.

FIG. 13 illustrates a sixth embodiment of a disc drive 300 that is similar to the disc drives 260, 270 illustrated in FIGS. 9 and 10, and the same reference numerals are used to identify the same or similar features in FIGS. 13, 9 and 10.

In FIG. 13, solid state switches 301, 302 are used instead of the relays 267, 275 used in FIGS. 9 and 10. Also, in FIG. 12, instead of either an NO or NC contact, two solid state switches are provided, effectively providing both NC and NO paths in one disconnect circuit 258. In FIG. 13, the amplifier 265 provides complementary (logically opposite) outputs V01 and V02 for driving the solid state switches 301, 302. If desired, the solid state switches can be activated slowly after a disconnect, thereby providing a smooth reapplication of the electrostatic control signal to the head electrical connection 237. Various types of transistors can be used for solid state switches 301, 302. In other respects, the circuits in FIGS. 13, 9 and 10 are arranged in the same way. It will be understood by those skilled in the art that hysteresis, time delay or both may be used in amplifier 265 to control reapplication of the control signal after a disconnection.

Figure 14:
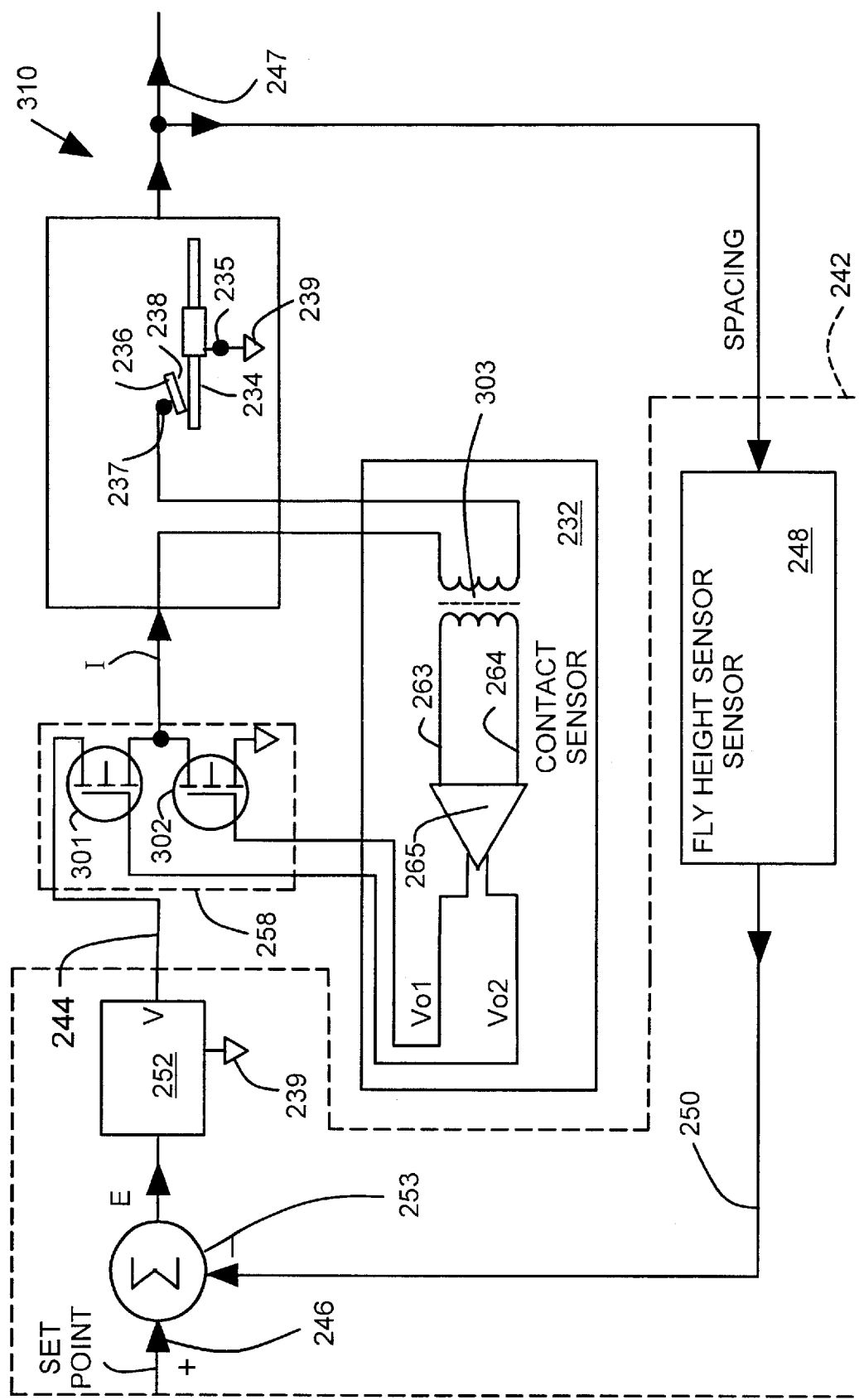
FIG. 14 illustrates a seventh embodiment of a disc drive with a contact sensor circuit.

FIG. 14 illustrates a seventh embodiment of a disc drive 310 that is similar to the disc drive 300 illustrated in FIG. 13 and the same reference numerals are used to identify the same or similar features in FIGS. 14 and 13.

In FIG. 14, a transformer 303 is used to sense excitation current component I instead of a resistor R. In other respects, the circuits in FIGS. 14 and 13 are arranged in the same way.

Figure 15:
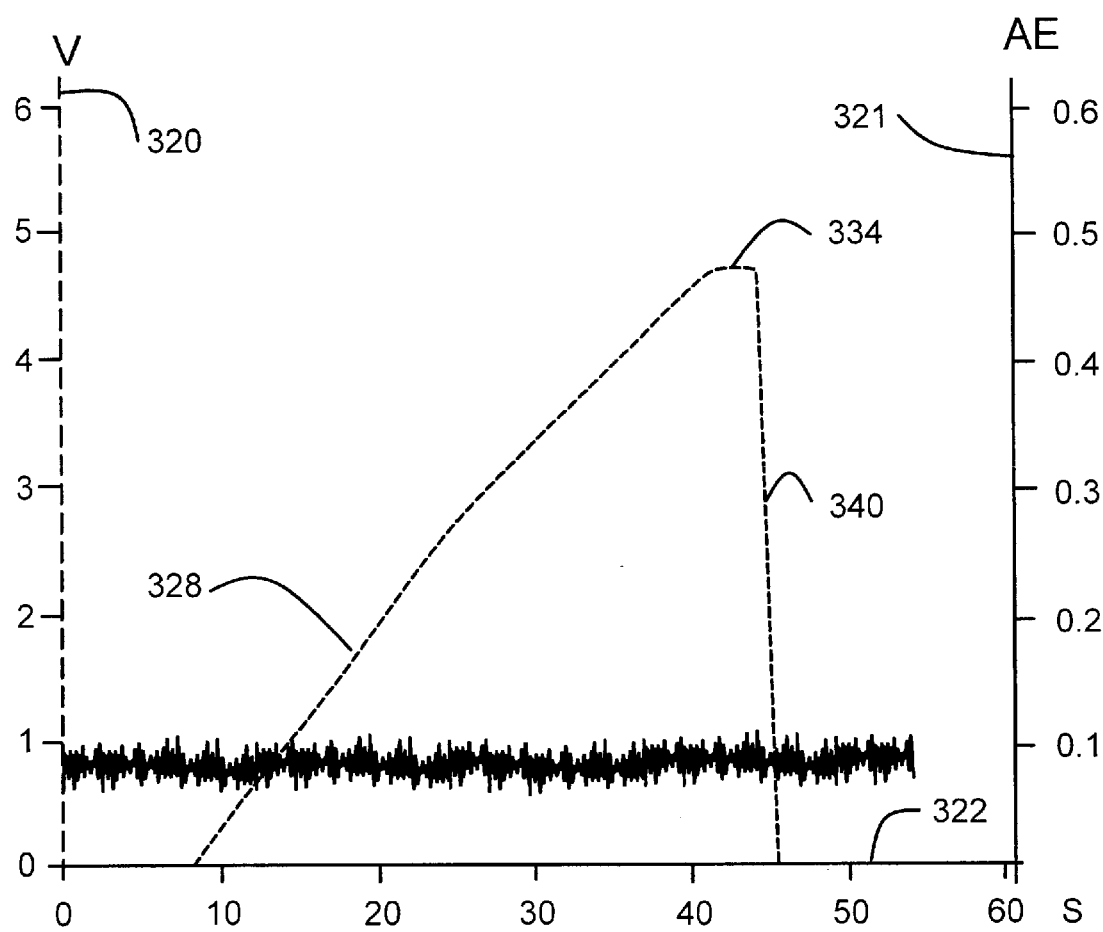
FIGS. 15–17 illustrate dual trace oscilloscope displays of an electrostatic excitation voltage V and an output of an acoustic emission sensor ES.
Figure 16:
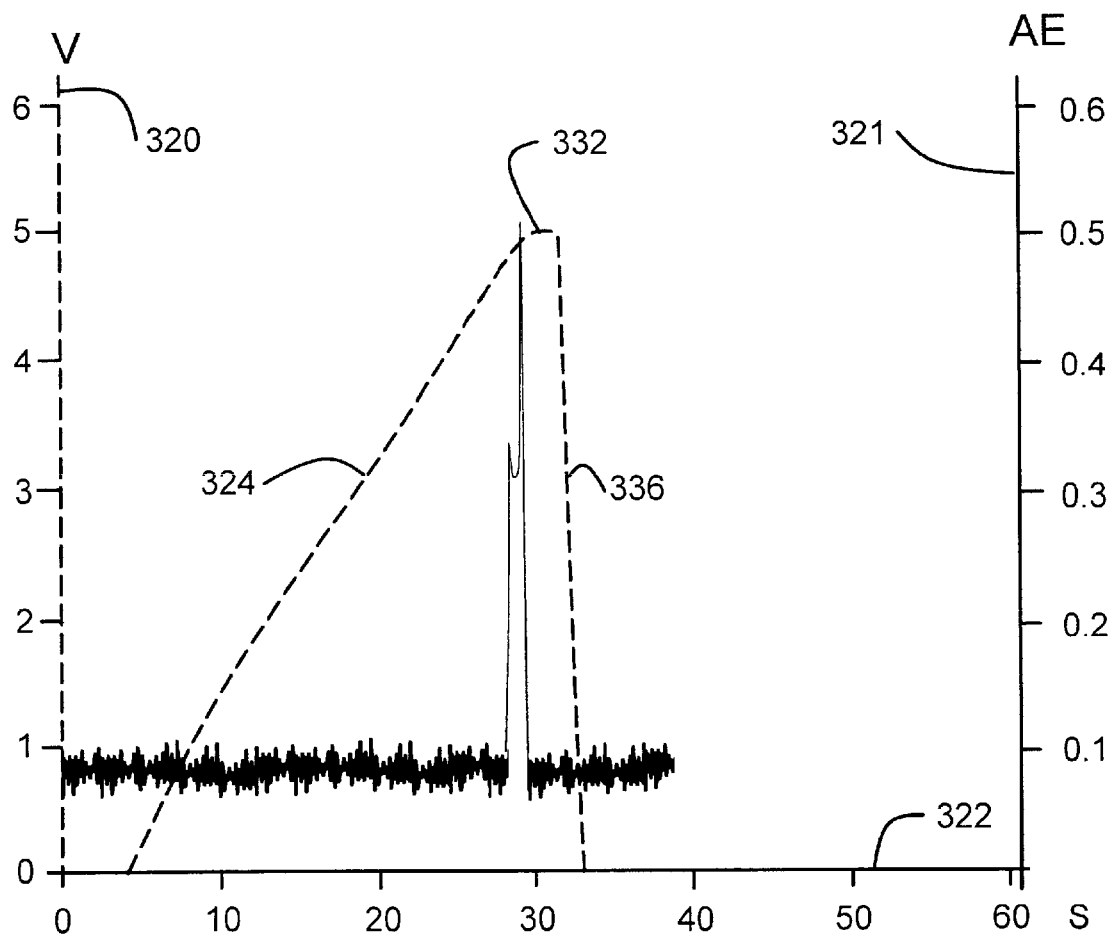
Figure 17:
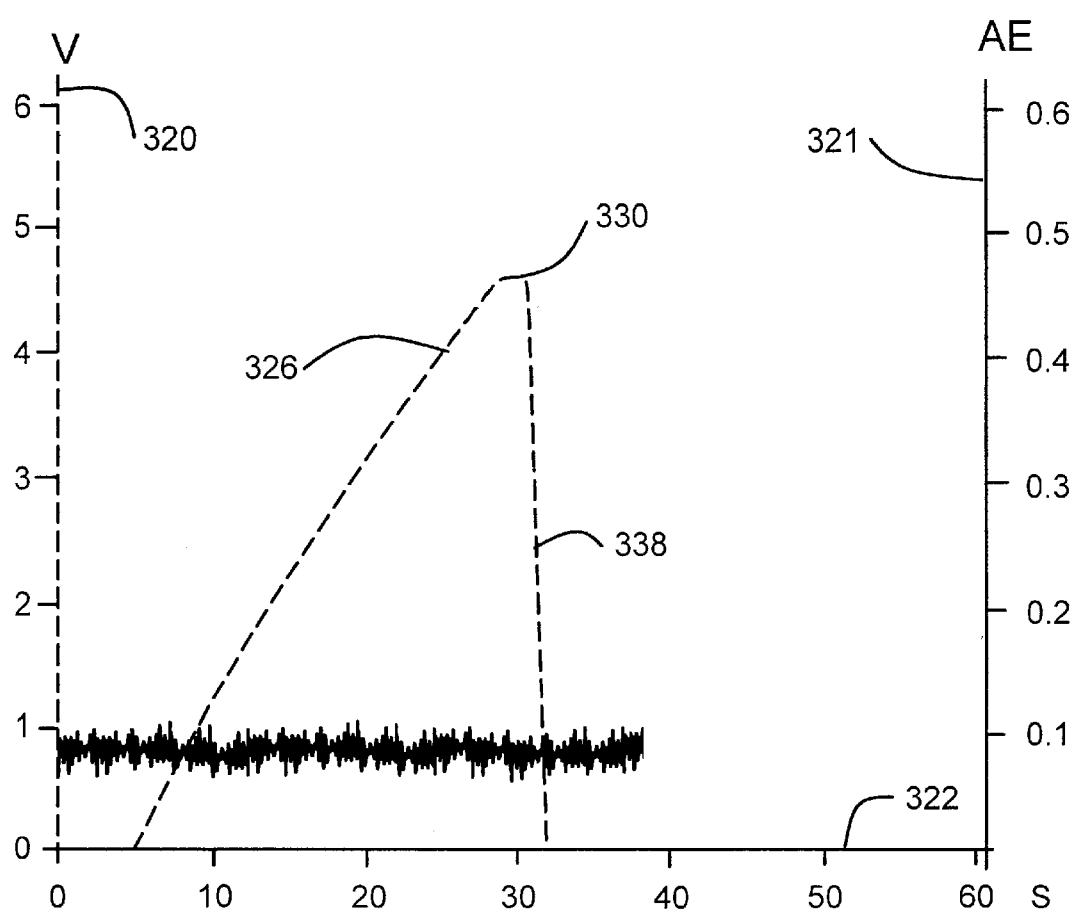

FIGS. 15–17 illustrate multiple traces of an oscilloscope display of electrostatic excitation voltage (left vertical axis 320, across the NO contacts of relay 267 in FIG. 9) and an output of an acoustic emission sensor output (right vertical axis 321) during repeated contacts between head 236 and disc 234 on a spin test stand. The oscilloscope monitors the electrostatic excitation voltage across the NO contacts of relay 267 rather than directly at the head to prevent current leakage through the oscilloscope from prematurely tripping the contact sensor 232. In FIGS. 15–17, the electrostatic excitation voltage and axis are represented by dashed lines, and the acoustic emission sensor output and axis are represented by solid lines. The horizontal axis 322 represents elapsed time in seconds while the electrostatic excitation voltage is manually increased as illustrated at 324, 326, 328. When contact is made at an unpredictable voltage level 330, 332, 334, the contact sensor circuit 232 senses contact, the relay 267 is activated and the excitation applied to the head electrical connection is rapidly reduced to near zero as illustrated at 336, 338, 340. In each of FIGS. 15–17, the contact sensor was able to reduce the voltage in time to avoid a crash, and no damage occurred.

Figure 18:
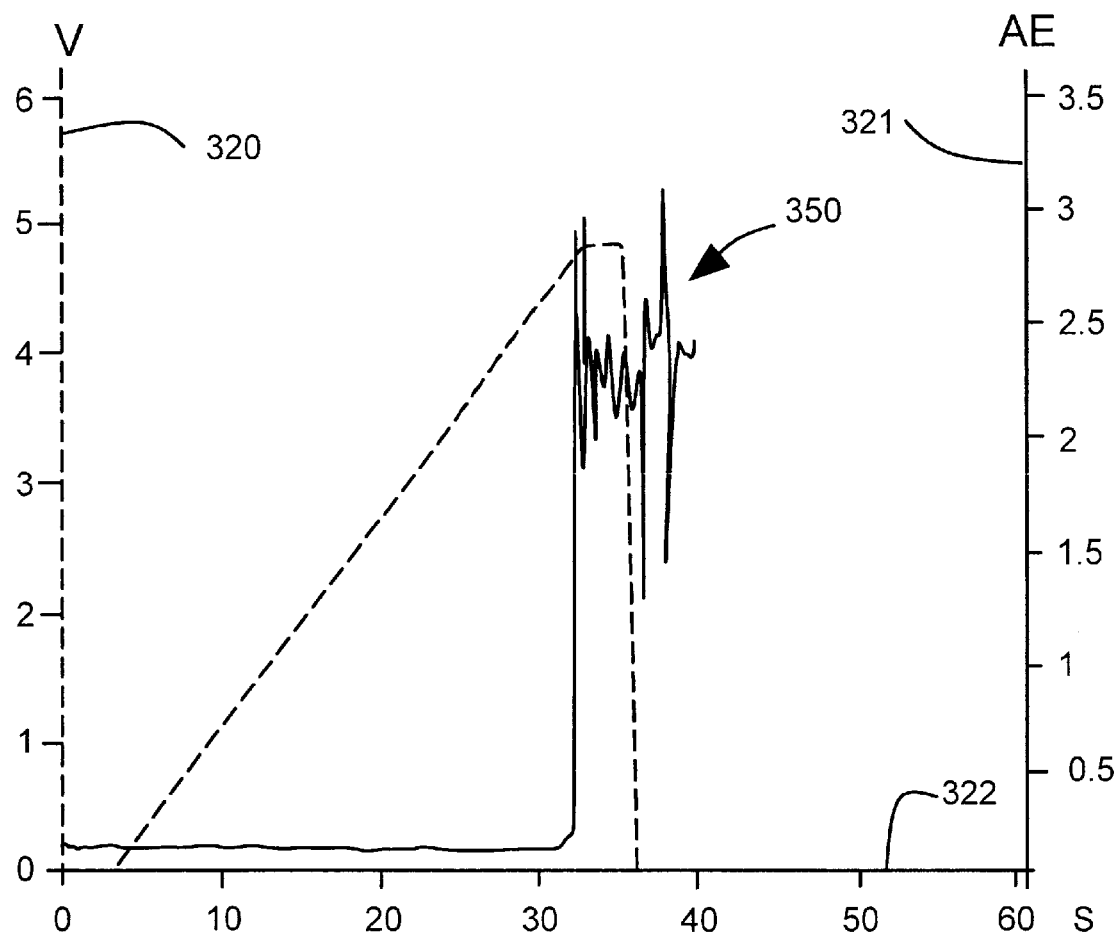
FIG. 18 illustrates a dual trace oscilloscope display of the voltage across resistor R in FIG. 8 and an output of an acoustic emission sensor with the contact sensor disabled.

FIG. 18 illustrates traces of a dual channel oscilloscope display that are similar to those illustrated in FIGS. 15–17. In FIG. 18, however, the contact sensing circuit has been disabled so that there is no disconnection of the electrostatic excitation. In FIG. 18, when the electrostatic excitation is manually increased, the head crashes as indicated by the prolonged high output 350 of the acoustic emission sensor. FIG. 18 illustrates that head crash and damage can occur when the electrostatic excitation is not disconnected when contact is sensed.

In summary, a disc drive (100, 230, 260, 270, 280, 290, 300, 310) includes a disc (234) with a disc electrical connection (235) and a read/write head (236) with a head electrical connection (237). The read/write head has an air bearing surface (148, 238) shaped to provide a fly height spacing (156) between the air bearing surface and the disc.

The disc drive also includes a fly height spacing control system (242) that includes a controller (252) that provides a control signal (244) to the head electrical connection (237).

The disc drive also includes a contact sensor (232). The contact sensor senses an electrical current component (I) of the control signal (244) indicative of contact between the disc (234) and the read/write head (236). The contact sensor (232) provides a contact sensor output (256,266, Vo, Vo1, Vo2).

The disc drive also includes a disconnect circuit (258) that couples the control signal (244) to the head electrical connection (237). The disconnect circuit (258) responds to the contact sensor output (256, 266, Vo, Vo1, Vo2) and provides a disconnection of the control signal when contact is sensed.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the read/write while maintaining substantially the same functionality without departing from the scope and spirit of the present invention. For example, the contact sensor circuit and the disconnect circuit can be integrated with one another and also with the controller. In addition, although the preferred embodiment described herein is directed to a head for a hard disc drive system, it will be appreciated by those skilled in the art that the teachings of the present invention can be applied to other magnetic systems, like tape drives, without departing from the scope and spirit of the present invention.

What is claimed is:

1. A disc drive, comprising:
 a disc having a disc electrical connection;
 a read/write head having an air bearing surface shaped to provide a fly height spacing between the air bearing surface and the disc, the read/write head having a head electrical connection connected to a conductive region of the read/write head that faces the disc;
 a fly height spacing control system including a controller generating a control signal coupled to the disc electrical connection and the head electrical connection;
 a contact sensor sensing an electrical current component of the control signal indicative of contact between the disc and the read/write head, the contact sensor providing a contact sensor output; and
 a disconnect circuit coupling the control signal from the controller to the head electrical connection, the disconnect circuit providing a disconnection of the control signal responsive to the contact sensor output.

2. The disc drive of claim 1 wherein the fly height spacing control system further comprises a set point, a fly height sensor providing a fly height sensor output, and wherein the controller generates the control signal as a function of the set point and the fly height sensor output.

3. The disc drive of claim 1 wherein the conductive region acts as a first electrode, and wherein a portion of the disc facing the conductive region acts as a second electrode of an electrostatic fly height actuator actuated by the control signal to control the fly height.

4. The disc drive of claim 1 wherein the contact sensor comprises a resistance coupled in series between the controller and the head electrical connection, the resistance sensing the electrical current component.

5. The disc drive of claim 1 wherein the contact sensor comprises a resistance sensing the electrical current component and coupled in series between the disc electrical connection and a circuit common conductor.

6. The disc drive of claim 1 wherein the contact sensor comprises an amplifier generating the contact sensor output.

7. The disc drive of claim 1 wherein the disconnect circuit comprises a relay with a relay coil controlled by the contact sensor output and a relay switch that provides the disconnection.

8. The disc drive of claim 1 wherein the disconnect circuit comprises a solid state switch with a switch input that is controlled by the contact sensor and a switch output that provides the disconnection.

9. The disc drive of claim 1 wherein the disconnect circuit comprises a normally closed switch in series between the controller and the head electrical connection.

10. The disc drive of claim 1 wherein the disconnect circuit comprises a normally open switch that bypasses the control signal away from the head electrical connection.

11. The disc drive of claim 1 wherein the disconnect circuit comprises a normally closed switch in series with the control signal, and comprises a normally open switch that bypasses the control signal away from the head electrical connection.

12. A method of reducing damaging contact between a read/write head and a disc in a disc drive, comprising:
 providing a fly height spacing between an air bearing surface on the read/write head and the disc;
 providing a head electrical connection on the read/write head, the head electrical connection connecting to a conductive region of the read/write head that faces the disc;
 providing a disc electrical connection that is connected to the disc;
 providing a control signal from a fly height spacing control system to the head electrical connection and the disc electrical connection;

sensing an electrical current component of the control signal indicative of contact between the disc and the read/write head, and providing a contact sensor output; and disconnecting the control signal from the head electrical connection responsive to the contact sensor output.

13. The method of claim 12 and further comprising:

generating the control signal as a function of a set point and a fly height sensor output.

14. The method of claim 12 and further comprising:

sensing the electrical current component with a resistance coupled in series between the fly height spacing control system and the head electrical connection.

15. The method of claim 12 and further comprising:

providing the disconnection with a relay with a relay coil controlled by the contact sensor output and a relay switch that performs the disconnection.

16. The method of claim 12 and further comprising:

providing the disconnection with a solid state switch with a switch input that is controlled by the contact sensor and a switch output that performs the disconnection.

17. The method of claim 12 and further comprising:

providing the disconnection with a normally closed switch in series between the fly height control system and the head electrical connection.

18. The method of claim 12 and further comprising:

providing the disconnection with a normally open switch shunting the control signal that performs the disconnection.

19. The method of claim 12 and further comprising:

disconnecting the control signal with a normally closed switch in series with the control signal coupling and bypassing the control signal with a normally open switch, the switches being activated when contact is sensed.

20. A disc drive, comprising:

a disc and a read/write head that has an air bearing surface shaped to provide a fly height spacing between the air bearing surface and the disc, the fly height spacing being controlled by a fly height spacing control system;

means for sensing contact between the disc and the read/write head and means for disconnecting the fly height spacing control system when contact is sensed.

21. The disc drive of claim 20 wherein the fly height spacing control system comprises a set point, a fly height sensor providing a fly height sensor output, and a controller, and the controller generates a control signal as a function of the set point and the fly height sensor output.

22. The disc drive of claim 21 wherein the means for disconnecting comprises a normally closed switch coupled in series with the control signal.

23. The disc drive of claim 21 wherein the read/write head includes a head electrical connection connected to a conductive region of the read/write head that faces the disc and the disc includes a disc electrical connection, the control signal coupling through the means for disconnecting to the head electrical connection.

24. The disc drive of claim 23 wherein the means for sensing contact comprises a resistance coupled in series between the fly height spacing control system and the head electrical connection, the resistance sensing an electrical current component of the control signal.

25. The disc drive of claim 23 wherein the means for sensing contact comprises a resistance coupled in series between the disc electrical connection and a circuit common conductor.

26. The disc drive of claim 20 wherein the means for sensing contact comprises an amplifier generating a contact sensor output.

27. The disc drive of claim 20 wherein the means for disconnecting comprises a relay with a relay coil controlled by the contact sensor output and a relay switch that provides the disconnection.

28. The disc drive of claim 20 wherein the means for disconnecting comprises a solid state switch with a switch input that is controlled by the contact sensor and a switch output that provides the disconnection.

* * * * *